United States Patent

Campen et al.

[15] 3,700,767
[45] Oct. 24, 1972

[54] RECOVERY OF SULFONIUM SALT EXTRACTING AGENTS

[72] Inventors: Jan P. Campen; Riekert Kok, both of Amsterdam, Netherlands

[73] Assignee: Shell Oil Company, New York, N.Y.

[22] Filed: April 23, 1971

[21] Appl. No.: 136,961

[30] Foreign Application Priority Data

May 4, 1970 Great Britain..........21,259/70

[52] U.S. Cl.....................423/24, 23/312 R, 423/139
[51] Int. Cl. ........C01g 3/04, C01g 49/10, C01g 9/04
[58] Field of Search ......23/87 R, 117, 50 R, 97, 125, 23/126, 312 R

[56] References Cited

UNITED STATES PATENTS

| | | |
|---|---|---|
| 3,069,231 | 12/1962 | Hard et al.......................23/17 |
| 3,131,998 | 5/1964 | Swanson....................23/87 R |
| 3,251,646 | 5/1966 | Alon et al......................23/50 |
| 3,336,133 | 8/1967 | Funatsu et al..........23/87 R X |
| 3,432,257 | 3/1969 | Spitzer et al...................23/87 |
| 3,622,269 | 11/1971 | Yamamura et al.........23/87 R |

*Primary Examiner*—Edward Stern
*Attorney*—Howard W. Haworth and Martin S. Baer

[57] ABSTRACT

Recovery by hydrolysis of sulfonium salt extracting agents from metal value separation streams is improved when a portion of the aqueous hydrolysis effluent is recycled.

4 Claims, 1 Drawing Figure

PATENTED OCT 24 1972  3,700,767
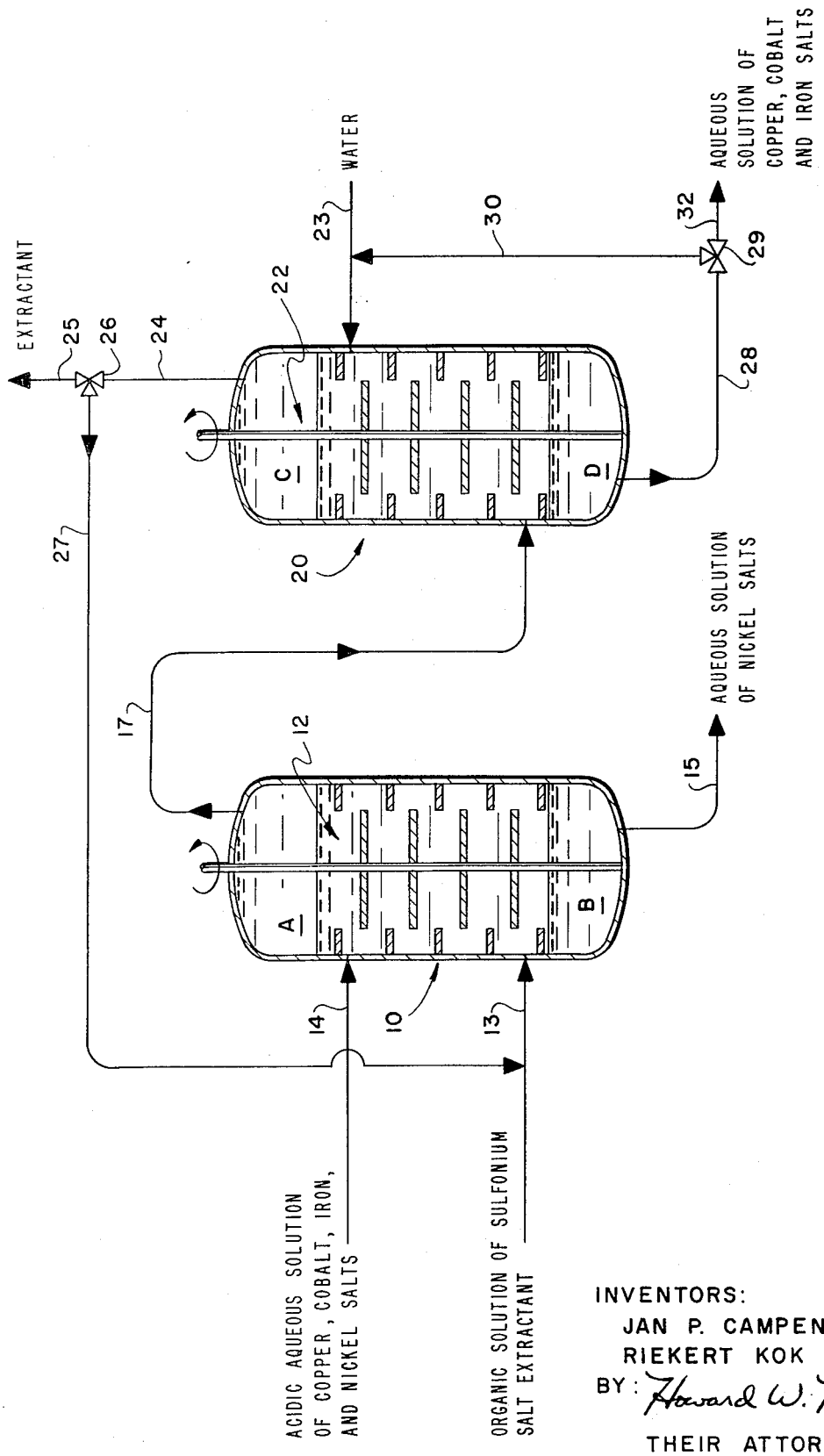
INVENTORS:
JAN P. CAMPEN
RIEKERT KOK
BY: *Howard W. Haworth*
THEIR ATTORNEY

RECOVERY OF SULFONIUM SALT EXTRACTING AGENTS

BACKGROUND OF THE INVENTION

1. Field of the Invention

This invention relates to an improved method for recovering sulfonium salts used as extractants in liquid/liquid extraction processes for separation of metal values.

2. The Prior Art

U.S. Pat. No. 3,432,257, issued Mar. 11, 1969 to E. Spitzer et al., describes a process for the use of oleophilic sulfonium salts, such as di-n-octylmethylsulfonium chloride, as extracting agents for the liquid/liquid extraction of copper, cobalt and iron values from acidic aqueous solutions. In this process a metal value-rich aqueous solution is contacted with a water-immiscible nonaqueous solution of the sulfonium salt. Copper, cobalt, and iron values are extracted into the non-aqueous phase and the phases are separated. The metal values must then be separated from the non-aqueous phase. For any practical commercial operation, the organic extractant must be recovered as completely as possible and reused. U.S. Pat. No. 3,432,257 employs conventional techniques for separating the metal value and recovering the nonaqueous phase, that is, the metal-rich non-aqueous phase is hydrolyzed by contact with water or preferably acidulated water so that the metal values pass into the aqueous phase giving a metal-lean organic phase for recycle. This method has the disadvantage of permitting substantial amounts of the sulfonium salt, often nearly 1 percent, to be lost into the aqueous phase. In commercial mining, where large quantities of often low grade ore are processed, losses of sulfonium salt of this magnitude are unacceptable.

STATEMENT OF THE INVENTION

It has now been found that the recovery of metal value-lean sulfonium salt extracting agents by hydrolysis of a metal value-rich extract with water is improved by recycling a portion of the metal-containing aqueous hydrolysis product to the hydrolysis zone. This improvement substantially reduces the loss of organic sulfide extracting agents during the hydrolysis step.

This invention will be further described with reference to the drawing wherein the sole FIGURE is a diagrammatic cross-sectional view of one form of apparatus suitable for practicing this invention.

DETAILED DESCRIPTION OF THE INVENTION

The Extraction Process

The extraction process which is improved by this invention comprises bringing an acidic, preferably halide-ion-containing, aqueous solution of one or more metal salts into contact with a water-immiscible organic solvent containing one or more sulfonium salts. The organic extract phase which results after phase separation is used as starting material in the process of the present invention.

The sulfonium salt used as extracting agent is considerably more soluble in the organic phase than in the aqueous phase. It is preferred to use alkylsulfonium salts with an "effective chain length" of at least nine atoms, in particular of from 15 to 25 atoms. By "effective chain length" is meant the number of atoms of the longest chain present in the molecule, which chain contains the sulfur atom in addition to carbon atoms. Thus, the effective chain length of, for example, a di-n-decylmethylsulfonium salt amounts to 21 atoms, i.e., $2 \times 10$ carbon-atoms and one sulfur atom. Preferred sulfonium salts are those having a single sulfonium group in the molecule and likewise those in which no hydrogen atom is attached to the sulfur atom, i.e., tertiary sulfonium salts. A halide ion is preferred at the anion of the sulfonium salt, in particular a chloride ion. Examples of very suitable salts are n-hexadecyl-n-dodecylmethylsulfonium chloride and di-n-octylmethylsulfonium chloride. Very good results have been obtained with di-sec-decylmethylsulfonium chloride.

The sulfonium salt used as extracting agent is dissolved in the water-immiscible organic solvent, i.e., in a normally liquid solvent which is not miscible with water in all proportions, in particular in a solvent of which not more than 5 percent by volume dissolves in water of 20°C. Concentrations of sulfonium salt of from about 0.05 mole/liter to the solubility limit are generally useful. Preferred solvents are halogenated aliphatic hydrocarbons such as chloroform, 1,2-dichloroethane and 1,2,3-trichloropropane, especially the chlorinated aliphatic hydrocarbon of up to about 4 carbon atoms, preferably diluted with aliphatic or aromatic hydrocarbons such as kerosine, xylenes, dodecane, and the like.

The extraction process is most suitably used for the separation of nickel, cobalt, copper and iron values. Under suitable conditions with this sulfonium salt extractant a very pure nickel salt solution is obtained as an aqueous raffinate, while the iron, copper and cobalt salts are taken up in the organic extract in the form of complexes with the sulfonium salt. The metal value-containing feedstock for such an extraction is typically acidic and most suitably contains halide ions, preferably chloride ions. These chloride ions may be derived from added salts, such as NaCl, but are preferably derived from acids, in particular from HCl. These sulfonium salt extracting agents become more efficient as acidity is raised. Iron is extracted efficiently at HCl concentrations of 1N–4N or higher. Cobalt is extracted from 4N–8N or higher HCl solutions while copper is extracted well from solutions containing at least 6N HCl. While extraction efficiency is lower it is often desirable to use lower than ideal acidities and employ a multistage contacting. It is recommended to carry out the metal extraction continuously, in stages and to apply a counter-current contacting process.

The Improved Recovery of Metal Values and Sulfonium Salts

Following phase separation, major proportions of metal values are recovered from the organic extract and the sulfonium salt is regenerated by hydrolysis with water. This hydrolysis is carried out preferably with stirring, so as to improve the contact between the phases, and in counter-current flow. In this context the term "water" is meant to include an aqueous solutions, of mineral acids, that is an acidic aqueous solution such as dilute (0.1 to 1 normal) HCl. As a result of a certain solubility of the sulfonium salt in the aqueous phase, conventionally a small but definite loss of sulfonium salt will occur.

This extractant loss may be minimized according to the invention by returning to the hydrolysis zone at least part of the aqueous phase which has been separated from the hydrolyzed organic phase in that zone. If use is made of the preferred continuous method for carrying out the process according to the invention, this means a recycle of part of the separated aqueous phase to the hydrolysis step.

The hydrolysis is advantageously carried out stagewise, preferably in two to 10 stages, in counter-current flow, while maintaining good contact between the organic and aqueous phases, for example, by stirring or pumping. A suitable apparatus for this purpose is a rotating disc contactor. The volume ratio of the organic extract to the water used in the hydrolysis step may in general range from 1:20 to 5:1, preferably from 1:5 to 1:1 . The hydrolysis temperature is suitably 10° to 30°C, for instance around 20°C, though temperatures between about 5° and 90°C may be employed if desired. Usually, it will be sufficient to contact the organic extract with water for a period of from 1 to 60 minutes.

The aqueous phase separated from the organic phase after the hydrolysis contains substantially all of the metal values originally present in the organic extract. In continuous operation, the amount of aqueous phase returned to the hydrolysis is preferably 10–90 percent, in particular 25–75 percent of the original hydrolysis water feed. Make-up water is added to arrive at the volume desired for the hydrolysis.

If desired, the hydrolysis solution may contain some acid and/or alcohol; this will reduce the risk of emulsification. An acidity of from 0.1 to about 1 gram/mole/liter, and an alcohol content of from 1 to 50%v will in general suffice for this purpose. Preferably the acid used is a mineral acid such as HCl, while suitable alcohols are alkanols such as ethanol. Other alkanols which may be used are octyl or dodecyl alcohol.

DESCRIPTION OF THE FIGURE

Referring now to the FIGURE which illustrates one modification of the invention, vertical rotating disc contactor 10, defining a contacting zone, is provided with stirrer 12 an axially positioned shaft equipped with equally spaced flat disc rotors and annular ring stators equally spaced within the contactor shell. A liquid solution of di-n-dodecylmethylsulfonium chloride extractant in 75%v chloroform/25%v kerosine solvent is introduced into a lower section of contactor 10 via conduit 13. An aqueous solution of copper, cobalt, iron and nickel values, acidified with hydrochloric acid, is introduced into an upper section of contactor 10 via conduit 14 and passes in counter-current through the extractant solution. The contacting zone of contactor 10 functions as a mixer, intimately contacting the two liquids. Contactor 10 also functions as a phase separator, separating a copper, cobalt, and iron value-rich organic extract as phase A, and a copper, cobalt and iron value-lean aqueous raffinate phase B. The nickel value-rich raffinate, phase B, is removed via conduit 15. The extract phase A is passed through conduit 17 and introduced into a lower portion of a hydrolysis zone, e.g., a second rotating disc contactator, 20, which is provided with stirrer 22, essentially similar to stirrer 12. Acidulated water for hydrolysis is introduced into an upper portion of contactor 20 via line 23 and passes in counter-current through the metal-value-laden extract. The two liquids are intimately contacted by stirrer 22. Contactor 20 also functions as a phase separator. Organic extractant freed of metal values and suitable for re-use is separated as phase C and removed via conduit 24 to three-way valve 26 and either removed via conduit 25 or preferably returned to conduit 13 via conduit 27. A copper, cobalt and iron value-rich second aqueous phase D is separated and removed via conduit 28 to a three-way valve 29. In accordance with this invention about 40% of the second aqueous phase is returned to conduit 23 via conduit 30. The remainder of the aqueous phase is removed via conduit 32. Make-up water for hydrolysis is added via conduit 23.

The invention will be further described with reference to an Example. This example is given for illustration and is not intended to limit the invention.

EXAMPLE

Two experiments were performed at 20°C in a continuous manner in counter-current extraction and hydrolysis units. Each unit comprised four agitated mixer/settlers with intermediate nylon pumps. The feed for the extraction unit was an aqueous solution containing $NiCl_2$ (50 g/l), $CoCl_2$ (1 g/l), $FeNH_4SO_4$ (2 g/l), $CuSO_4$ (0.1 g/l), $ZnSO_4$ (0.2 g/l), sulfate ions (60 g/l in all), chloride ions (210 g/l in all, of which 150 g/l was from HCl). The water-immiscible organic solvent used was a mixture of 75%v 1,2-dichloroethane and 25%v aromatic/aliphatic hydrocarbon solvent. It contained 0.2 mole/l of di-sec-decylmethylsulfonium chloride. The volume ratio of this organic solution to the aqueous solution fed to the extraction unit was 2/1. The effluents from this unit consisted of (a) an aqueous raffinate, mainly containing dissolved $NiCl_2$ and (b) an organic extract. The latter was first passed through a de-entrainment settler and then treated in the hydrolysis unit in one instance with 20%v water and in a second instance with an equal volume of a 1:1 mixture of water and hydrolysis unit aqueous effluent, i.e., the aqueous phase separated from the organic phase during hydrolysis. Residence times in the extraction and hydrolysis units were 3.5 minutes in each of the mixers and 5 minutes in each of the settlers for the organic phase. The aqueous phase had a residence time in each of the settlers of 10 minutes. The aqueous raffinate obtained in the extraction unit contained 99 percent of the $NiCl_2$ present in the feed and 0.08 percent of $CoCl_2$, based on the weight of $NiCl_2$. When the organic extract from the extraction unit was treated in the hydrolysis unit with water only, the loss of di-decylmethylsulfonium chloride in the aqueous effluent from the hydrolysis unit was 0.6% based on the sulfonium chloride fed to the extraction unit. When the hydrolysis was effected with the above 1:1 mixture of water and hydrolysis unit aqueous effluent, the loss of sulfonium chloride was only 0.1%w. The hydrolyzed organic phase was recycled to the extraction unit.

We claim as our invention:

1. In the process of extracting iron, cobalt or copper values from acidic solutions of their salts by (a) the process of (a) contacting in a first zone the aqueous solution with a non-aqueous solution of alkylsulfonium salt having an effective chain length of at least nine atoms, (b) separating the resulting non-aqueous extract and aqueous raffinate, (c) contacting the non-aqueous extract in a second zone with water, and (d) recovering the metal values from the resulting hydrolysis product mixture as a second aqueous solution; the improvement of reducing the loss of said alkylsulfonium salt which comprises returning from about 10 percent to about 90 percent of the second aqueous solution to the hydrolysis zone.

2. The process in accordance with claim 1 wherein from about 25 percent to about 75 percent of the second aqueous solution is returned to the hydrolysis zone.

3. The process in accordance with claim 2 wherein the sulfonium salt is a tertiary sulfonium salt having an effective chain length of 15 to 25 atoms.

4. The process in accordance with claim 3 wherein the water used for hydrolysis contains from 0.1 to 1.0 gram-mole/liter of hydrochloric acid.

* * * * *